(12) United States Patent
Sumin

(10) Patent No.: US 11,402,467 B2
(45) Date of Patent: Aug. 2, 2022

(54) METHODS AND COMPUTER DEVICES FOR DETERMINING ANGULAR OFFSET OF RADAR SYSTEM

(71) Applicant: YANDEX. TAXI LLC, Moscow (RU)

(72) Inventor: Anton Aleksandrovich Sumin, Slavyansk-na-Kubani (RU)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 367 days.

(21) Appl. No.: 16/565,886

(22) Filed: Sep. 10, 2019

(65) Prior Publication Data

US 2020/0209354 A1 Jul. 2, 2020

(30) Foreign Application Priority Data

Dec. 29, 2018 (RU) .............................. RU2018147498

(51) Int. Cl.
*G01S 7/40* (2006.01)

(52) U.S. Cl.
CPC .............. *G01S 7/4026* (2013.01); *G01S 7/40* (2013.01); *G01S 7/403* (2021.05)

(58) Field of Classification Search
CPC .......... G01S 7/4026; G01S 7/40; G01S 7/403; G01S 7/4091; G01S 13/931; G01S 13/50; G04F 8/00
USPC ........................................ 342/173, 165, 174
See application file for complete search history.

(56) References Cited

U.S. PATENT DOCUMENTS

| | | | |
|---|---|---|---|
| 5,964,822 A * | 10/1999 | Alland | G01S 13/42 701/301 |
| 5,977,906 A | 11/1999 | Ameen et al. | |
| 6,246,949 B1 | 6/2001 | Shirai et al. | |
| 6,900,755 B2 * | 5/2005 | Richardson | G01S 7/4026 342/174 |
| 8,125,372 B2 | 2/2012 | Muller-Frahm et al. | |
| 9,348,017 B2 * | 5/2016 | Steinlechner | G01S 13/931 |
| 9,423,498 B1 | 8/2016 | Brown | |

(Continued)

FOREIGN PATENT DOCUMENTS

| | | |
|---|---|---|
| CN | 106772319 A | 5/2017 |
| DE | 102013203574 A1 | 9/2014 |

(Continued)

OTHER PUBLICATIONS

European Search Report dated Jan. 17, 2020 issued in connection with the related European Patent Application 19209592.5.

(Continued)

*Primary Examiner* — Olumide Ajibade Akonai
*Assistant Examiner* — Alexander L. Syrkin
(74) *Attorney, Agent, or Firm* — BCF LLP

(57) ABSTRACT

Methods and computer devices for determining an angular offset of a radar system having been mounted on a vehicle having a forward direction of travel along a surface. The angular offset is an angle between the scanning direction and the forward direction. The method includes receiving radar data from the radar system. The method includes determining projections of an immobile object velocity in the scanning direction and a direction perpendicular to the scanning direction. The method also includes determining the angular offset of the radar system based on at least one of the projections of the immobile object velocity.

22 Claims, 6 Drawing Sheets

(56) References Cited

U.S. PATENT DOCUMENTS

| | | |
|---|---|---|
| 9,719,801 B1 | 8/2017 | Ferguson et al. |
| 2004/0117090 A1 | 6/2004 | Samukawa et al. |
| 2005/0179587 A1 | 8/2005 | Mosher et al. |
| 2005/0285774 A1 | 12/2005 | Wittenberg et al. |
| 2015/0070207 A1 | 3/2015 | Millar et al. |
| 2015/0276923 A1* | 10/2015 | Song .................. G01S 7/4026 702/97 |
| 2016/0003938 A1 | 1/2016 | Gazit et al. |
| 2016/0209211 A1* | 7/2016 | Song .................. G01S 7/4026 |
| 2016/0349363 A1 | 12/2016 | Millar et al. |
| 2017/0108863 A1 | 4/2017 | Chundrlik et al. |
| 2017/0293025 A1 | 10/2017 | Davis et al. |
| 2017/0343654 A1 | 11/2017 | Valois et al. |
| 2017/0356994 A1 | 12/2017 | Wodrich et al. |
| 2018/0024228 A1* | 1/2018 | Schiffmann ........... G01S 13/931 342/174 |
| 2018/0120414 A1 | 5/2018 | Alcalde et al. |
| 2018/0120416 A1 | 5/2018 | Kitamura et al. |
| 2018/0178722 A1 | 6/2018 | Ohta et al. |
| 2018/0203097 A1 | 7/2018 | Park et al. |
| 2018/0341007 A1* | 11/2018 | Fetterman ............ G01S 7/4026 |
| 2019/0187250 A1* | 6/2019 | Ru ........................ G01S 7/4021 |
| 2020/0326411 A1* | 10/2020 | Zhou .................... G01S 7/4026 |

FOREIGN PATENT DOCUMENTS

| | | | |
|---|---|---|---|
| DE | 102013021401 A1 * | 6/2015 | ........... G01S 13/878 |
| DE | 102015016888 A1 | 10/2016 | |
| DE | 102016216251 A1 | 3/2018 | |
| DE | 102017201099 A1 | 7/2018 | |
| EP | 0782008 A2 | 7/1997 | |
| EP | 1436640 A2 | 7/2004 | |
| EP | 2073034 A2 | 6/2009 | |
| EP | 3415943 A1 * | 12/2018 | ........... G01S 7/4026 |
| EP | 3588135 B1 * | 5/2021 | ........... G01S 13/582 |
| JP | 2015187589 A | 10/2015 | |
| WO | 2010132014 A1 | 11/2010 | |

OTHER PUBLICATIONS

Russian Search Report dated Jul. 14, 2020 issued in connection with the related Russian Patent Application RU 2018147498.

Dezhi Gao, "A method of spatial calibration for camera and radar", 2010 8th World Congress on Intelligent Control and Automation; Jinan, China; Jul. 7-9, 2010, DOI: 10.1109/WCICA.2010.5554411.

* cited by examiner

METHODS AND COMPUTER DEVICES FOR DETERMINING ANGULAR OFFSET OF RADAR SYSTEM

CROSS-REFERENCE

The present application claims priority from Russian Patent Application No. 2018147498, entitled "Methods and Computer Devices for Determining Angular Offset of Radar System" filed Dec. 29, 2018, the entirety of which is incorporated herein by reference.

FIELD OF TECHNOLOGY

The present technology relates to methods and computer devices for vehicle control, and more specifically, to methods and systems for determining an angular offset of a radar system.

BACKGROUND

Several computer-based navigation systems that are configured for aiding navigation and/or control of vehicle have been proposed and implemented in the prior art. These systems range from more basic map-aided localization-based solutions—i.e. use of a computer system to assist a driver in navigating a route from a starting point to a destination point; to more complex ones—computer-assisted and/or driver-autonomous driving systems.

Some of these systems are implemented as what is commonly known as a "cruise control" system. Within these systems, the computer system boarded on the vehicles maintains a user-set speed of the vehicle. Some of the cruise control system implement an "intelligent distance control" system, whereby the user can set up a distance to a potential car in front (such as, select a value expressed in a number of vehicles) and the computer system adjusts the speed of the vehicle at least in part based on the vehicle approaching the potential vehicle in front within the pre-defined distance. Some of the cruise control systems are further equipped with collision control systems, which systems upon detection of the vehicle (or other obstacle) in front of the moving vehicle, slow down or stop the vehicle.

Some of the more advanced system provide for a fully autonomous driving of the vehicle without direct control from the operator (i.e. the driver). These autonomously driven vehicles include computer systems that can cause the vehicle to accelerate, break, stop, change lane and self-park.

One of the main technical challenges in implementing the above computer systems is the ability for the computer system to detect an object located around the vehicle. In one example, the computer systems may need the ability to detect the vehicle in front of the present vehicle (the present vehicle having the computer system onboard), which vehicle in front may pose a risk/danger to the present vehicle and may require the computer system to take a corrective measure, be it breaking or otherwise changing speed, stopping or changing lanes.

Other technical challenges with the implementation of the above computer systems is de-calibration of sensors and other systems that gather data about surroundings the vehicle. A plethora of factors, including weather, road conditions, driving habits, for example, influence sensors and other systems over time which require calibration in order to ensure that data is accurately captured and correctly used by other systems for controlling vehicles.

SUMMARY

Developers of the present technology have realized that prior art solution have drawbacks.

In a first broad aspect of the present technology, there is provided a method of determining an angular offset of a radar system. The radar system has been mounted on a vehicle. The vehicle has a forward direction of travel along a surface, The radar system has a scanning direction. The angular offset is an angle between the scanning direction and the forward direction. The method is executable by a computer device. The computer device is communicatively coupled to the radar system. The method comprises receiving radar data from the radar system. The radar data includes point-specific data associated with a plurality of detected objects. The point-specific data associated with a given detect object is indicative of (i) a position of the given detected object, and (ii) an actual radial speed of the given detected object. The method comprises determining, by the computer device, projections of an immobile object velocity in (i) the scanning direction and (ii) a direction perpendicular to the scanning direction. The immobile object velocity is associated with a subset of detected objects of the plurality of detected objects. The subset of detected objects corresponds to at least one object that is immobile with respect to the surface. The projections of the immobile object velocity are derivable from the actual radial speed of the respective ones of the subset of detected objects. The method comprises determining, by the computer device, the angular offset of the radar system based on at least one of the projections of the immobile object velocity.

In some embodiments of the method, the determining the projections of the immobile object velocity comprises determining candidate projections of velocity (i) in the scanning direction and (ii) in the direction perpendicular to the scanning direction, for the plurality of detected objects based on the point-specific data of the plurality of detected objects. The determining the projections of the immobile object velocity comprises using the candidate projections of velocity and the respective positions of the plurality of detected objects to determine respective estimated radial speeds for the plurality of detected objects. The determining the projections of the immobile object velocity comprises, in response to a difference between (i) the estimated radial speeds of the plurality of detected objects and (ii) the actual radial speeds of the plurality of detected objects being below a threshold, determining that the plurality of detected objects is the subset of detected objects and that the candidate projections are the projections of the immobile object velocity.

In some embodiments of the method, the method further comprises in response to the difference between (i) the estimated radial speed of a given detected object and (ii) the actual radial speed of the given detected object being above the threshold, removing the given detected object from the plurality of detected objects thereby generating a reduced set of detected objects, the given detected object corresponding to a non-immobile object with respect to the surface. The method further comprises determining new candidate projections of velocity (i) in the scanning direction and (ii) in the direction perpendicular to the scanning direction, for the reduced set of detected objects based on the point-specific data of the reduced set of detected objects. The method further comprises using the new candidate projections and the respective positions of the reduced set of detected objects to determine respective new estimated radial speeds for the reduced set of detected objects. The method further comprises, in response to differences between (i) the respective new estimated radial speeds of the reduced set of detected objects and (ii) the respective actual radial speeds of the reduced set of detected objects being below the threshold, determining that the reduced set of detected objects is the subset of detected objects and that the new candidate projections are the projections of the immobile object velocity.

In some embodiments of the method, the method comprises determining the respective estimated radial speeds for the plurality of detected objects by applying a following equation:

$$V_{imob-cand-x} * \frac{x_i}{r_i} + V_{imob-cand-y} * \frac{y_i}{r_i} = v_{i-est}$$

In some embodiments of the method, the determining the angular offset of the radar system is performed by applying a following equation:

$$\theta = \pi - \arctan 2(V_{imob-y}, V_{imob-x})$$

In some embodiments of the method, the radar data is captured when the vehicle is travelling along the forward direction of travel at the velocity of the vehicle.

In some embodiments of the method, the velocity of the vehicle is substantially constant.

In some embodiments of the method, the forward direction is a strict forward direction.

In some embodiments of the method, the position of a given detected object is at least one of: (i) a distance of the given detected object from the radar system, and (ii) a horizontal angle of the given detected object with the scanning direction of the radar system; and a distance of the given detected object from the radar system (i) in the scanning direction, and (ii) in the direction perpendicular to the scanning direction.

In some embodiments of the method, the actual radial speed of a given detected object is a doppler speed of the given detected object as determined by the radar system.

In some embodiments of the method, the determining the projections of the immobile object velocity is performed by the computer device employing an iterative optimization algorithm.

In some embodiments of the method, the iterative optimization algorithm is a Random Sample Consensus (RANSAC) algorithm.

In some embodiments of the method, the determining the candidate projections of velocity is performed by the computer device employing an Ordinary Least Squares (OLS) algorithm.

In some embodiments of the method, the OLS algorithm is employed on a following set of equations:

$$v_{x_1} * \frac{x_1}{r_1} + v_{y_1} * \frac{y_1}{r_1} = v_1$$
$$v_{x_2} * \frac{x_2}{r_2} + v_{y_2} * \frac{y_2}{r_2} = v_2$$
$$v_{x_3} * \frac{x_3}{r_3} + v_{y_3} * \frac{y_3}{r_3} = v_3$$
$$v_{x_1} = v_{x_2} = v_{x_3} = V_{imob-cand-x}$$
$$v_{y_1} = v_{y_2} = v_{y_3} = V_{imob-cand-y}$$

In some embodiments of the method, the subset of detected objects includes at least a pre-determined portion of detected objects of the plurality of detected objects.

In some embodiments of the method, the method further comprises verifying, by the computer device, that the subset of detected objects includes at least the pre-determined portion of detected objects of the plurality of detected objects.

In some embodiments of the method, the subset of detected objects includes at least a pre-determined number of detected objects.

In some embodiments of the method, the method further comprises verifying, by the computer device, that the subset of detected objects includes at least the pre-determined number of detected objects.

In some embodiments of the method, the determining the angular offset of the radar system is executed in response to the subset of detected objects including at least one of: at least a pre-determined portion of detected objects of the plurality of detected objects, and at least a pre-determined number of detected objects.

In some embodiments of the method, (i) the receiving the radar data, (ii) the determining projections of the immobile object velocity, and (iii) the determining the angular offset are repeatedly executed by the computer device at (i) a first moment in time, and (ii) a second moment in time after the first moment in time.

In some embodiments of the method, the method further comprises performing, by the computer device, extrinsic calibration of the radar system at the first moment in time based on the angular offset determined at the first moment in time, and performing, by the computer device, extrinsic calibration of the radar system at the second moment in time based on the angular offset determined at the second moment in time.

In some embodiments of the method, the determining the projections of the immobile object velocity comprises iteratively determining, by the computer device, candidate projections based on the point-specific data of respective iteratively-reduced sets of detected objects.

In some embodiments of the method, detected objects from the subset of detected objects have substantially similar movement patterns relative to the radar system.

In some embodiments of the method, the movement pattern is being immobile relative to the surface.

In some embodiments of the method, the movement pattern is moving with a substantially same velocity in a direction opposite to the forward direction of travel.

In a second broad aspect of the present technology, there is provided a computer device for determining an angular offset of a radar system. The radar system has been mounted on a vehicle. The vehicle has a forward direction of travel along a surface. The radar system has a scanning direction. The angular offset is an angle between the scanning direction and the forward direction. The computer device is communicatively coupled to the radar system. The computer device is configured to receive radar data from the radar system. The radar data including point-specific data associated with a plurality of detected objects. The point-specific data associated with a given detect object is indicative of (i) a position of the given detected object, and (ii) an actual radial speed of the given detected object. The computer device is configured to determine projections of an immobile object velocity in (i) the scanning direction and (ii) a direction perpendicular to the scanning direction. The immobile object velocity is associated with a subset of detected objects of the plurality of detected objects. The subset of detected objects corresponds to at least one object that is immobile with respect to the surface. The projections of the immobile object velocity are derivable from the actual radial speed of the respective ones of the subset of detected objects. The computer device is configured to determine the angular offset of the radar system based on at least one of the projections of the immobile object velocity.

In some embodiments of the computer device, the computer device configured to determine the projections of the immobile object velocity comprises the computer device configured to determine candidate projections of velocity (i) in the scanning direction and (ii) in the direction perpendicular to the scanning direction, for the plurality of detected objects based on the point-specific data of the plurality of detected objects. The computer device is also configured to use the candidate projections of velocity and the respective positions of the plurality of detected objects to determine respective estimated radial speeds for the plurality of detected objects. The computer device is also configured to, in response to a difference between (i) the estimated radial speeds of the plurality of detected objects and (ii) the actual radial speeds of the plurality of detected objects being below a threshold, determine that the plurality of detected objects is the subset of detected objects and that the candidate projections are the projections of the immobile object velocity.

In some embodiments of the computer device, the computer device is further configured to, in response to the difference between (i) the estimated radial speed of a given detected object and (ii) the actual radial speed of the given detected object being above the threshold, remove the given detected object from the plurality of detected objects thereby generate a reduced set of detected objects. The given detected object corresponds to a non-immobile object with respect to the surface. The computer device is further configured to determine new candidate projections of velocity (i) in the scanning direction and (ii) in the direction perpendicular to the scanning direction, for the reduced set of detected objects based on the point-specific data of the reduced set of detected objects. The computer device is further configured to use the new candidate projections and the respective positions of the reduced set of detected objects to determine respective new estimated radial speeds for the reduced set of detected objects. The computer device is further configured to, in response to differences between (i) the respective new estimated radial speeds of the reduced set of detected objects and (ii) the respective actual radial speeds of the reduced set of detected objects being below the threshold, determine that the reduced set of detected objects is the subset of detected objects and that the new candidate projections are the projections of the immobile object velocity.

In some embodiments of the computer device, the computer device is configured to determine the respective estimated radial speeds for the plurality of detected objects by applying a following equation:

$$V_{imob-cand-x} * \frac{x_i}{r_i} + V_{imob-cand-y} * \frac{y_i}{r_i} = v_{i-est}$$

In some embodiments of the computer device, the computer device is configured to determine the angular offset of the radar system by applying a following equation:

$$\theta = \pi - \arctan 2(V_{imob-y}, V_{imob-x})$$

In some embodiments of the computer device, the radar data is captured when the vehicle is travelling along the forward direction of travel at the velocity of the vehicle.

In some embodiments of the computer device, the velocity of the vehicle is substantially constant.

In some embodiments of the computer device, the forward direction is a strict forward direction.

In some embodiments of the computer device, the position of a given detected object is at least one of:
(i) a distance of the given detected object from the radar system, and (ii) a horizontal angle of the given detected object with the scanning direction of the radar system; and
a distance of the given detected object from the radar system (i) in the scanning direction, and (ii) in the direction perpendicular to the scanning direction.

In some embodiments of the computer device, the actual radial speed of a given detected object is a doppler speed of the given detected object as determined by the radar system.

In some embodiments of the computer device, the computer device is configured to determine the projections of the immobile object velocity by employing an iterative optimization algorithm.

In some embodiments of the computer device, the iterative optimization algorithm is a Random Sample Consensus (RANSAC) algorithm.

In some embodiments of the computer device, the computer device is configured to determine the candidate projections of velocity by employing an Ordinary Least Squares (OLS) algorithm.

In some embodiments of the computer device, the OLS algorithm is employed on a following set of equations:

$$v_{x_1} * \frac{x_1}{r_1} + v_{y_1} * \frac{y_1}{r_1} = v_1$$

$$v_{x_2} * \frac{x_2}{r_2} + v_{y_2} * \frac{y_2}{r_2} = v_2$$

$$v_{x_3} * \frac{x_3}{r_3} + v_{y_3} * \frac{y_3}{r_3} = v_3$$

$$v_{x_1} = v_{x_2} = v_{x_3} = V_{imob-cand-x}$$

$$v_{y_1} = v_{y_2} = v_{y_3} = V_{imob-cand-y}$$

In some embodiments of the computer device, the subset of detected objects includes at least a pre-determined portion of detected objects of the plurality of detected objects.

In some embodiments of the computer device, the computer device is further configured to verify that the subset of detected objects includes at least the pre-determined portion of detected objects of the plurality of detected objects.

In some embodiments of the computer device, the subset of detected objects includes at least a pre-determined number of detected objects.

In some embodiments of the computer device, the computer device is further configured to verify that the subset of detected objects includes at least the pre-determined number of detected objects.

In some embodiments of the computer device, the computer device is configured to determine the angular offset of the radar system in response to the subset of detected objects including at least one of: at least a pre-determined portion of detected objects of the plurality of detected objects, and at least a pre-determined number of detected objects.

In some embodiments of the computer device, the computer device is configured to (i) receive the radar data, (ii) determine projections of the immobile object velocity, and (iii) determine the angular offset are repeatedly executed by the computer device at (i) a first moment in time, and (ii) a second moment in time after the first moment in time.

In some embodiments of the computer device, the computer device is further configured to perform extrinsic calibration of the radar system at the first moment in time based on the angular offset determined at the first moment in time, and perform extrinsic calibration of the radar system at the second moment in time based on the angular offset determined at the second moment in time.

In some embodiments of the computer device, the computer device is configured to determine the projections of the immobile object velocity comprises the computer device being configured to iteratively determine candidate projections based on the point-specific data of respective iteratively-reduced sets of detected objects.

In some embodiments of the computer device, detected objects from the subset of detected objects have substantially similar movement patterns relative to the radar system.

In some embodiments of the computer device, the movement pattern is being immobile relative to the surface.

In some embodiments of the computer device, the movement pattern is moving with a substantially same velocity in a direction opposite to the forward direction of travel.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
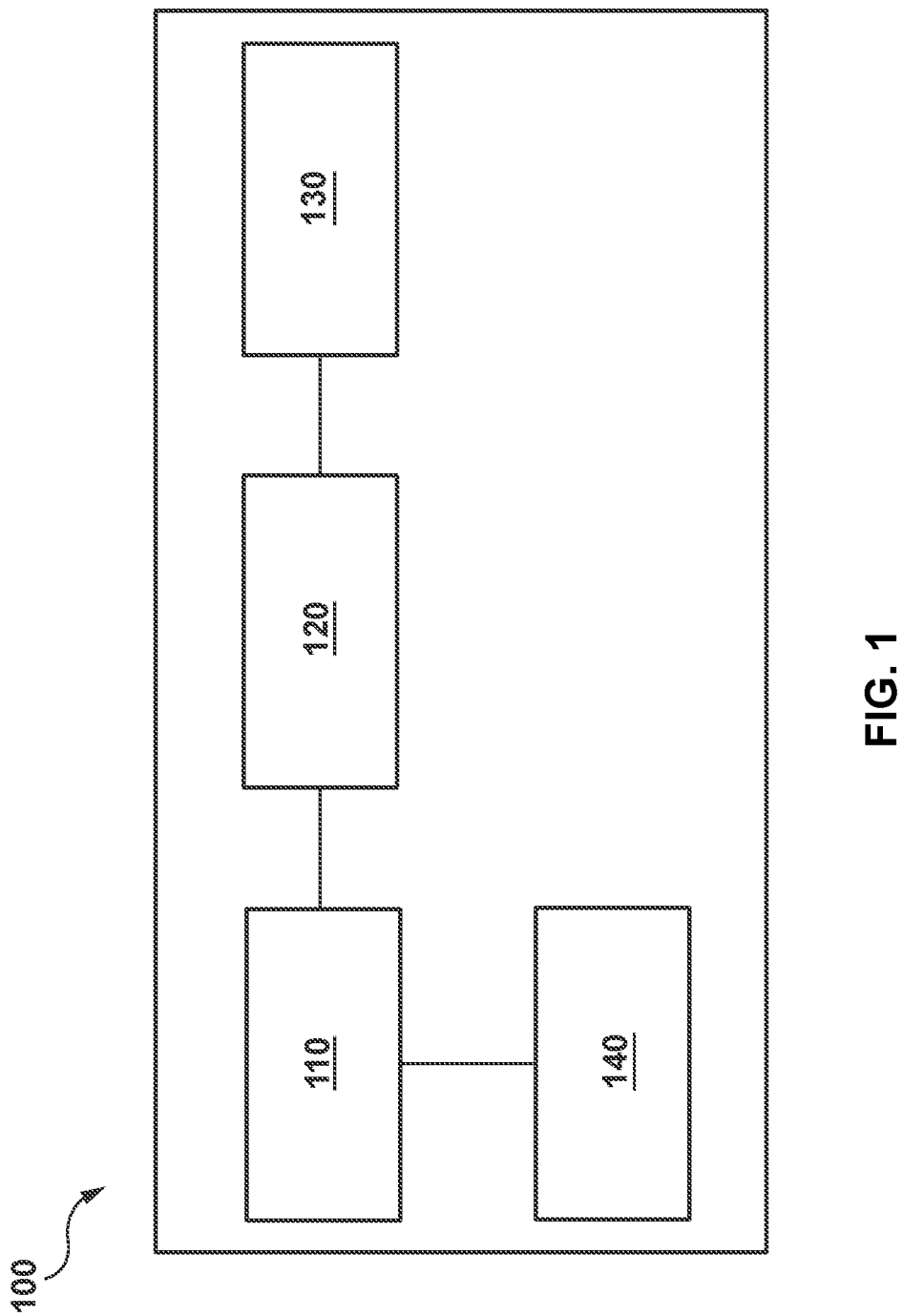
FIG. 1 depicts a schematic diagram of an example computer system for implementing certain embodiments of systems and/or methods of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Referring initially to FIG. 1, there is shown a computer system 100 suitable for use with some implementations of the present technology, the computer system 100 comprising various hardware components including one or more single or multi-core processors collectively represented by processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, locationalization modules, and the like.

Networked Computer Environment

Figure 2:
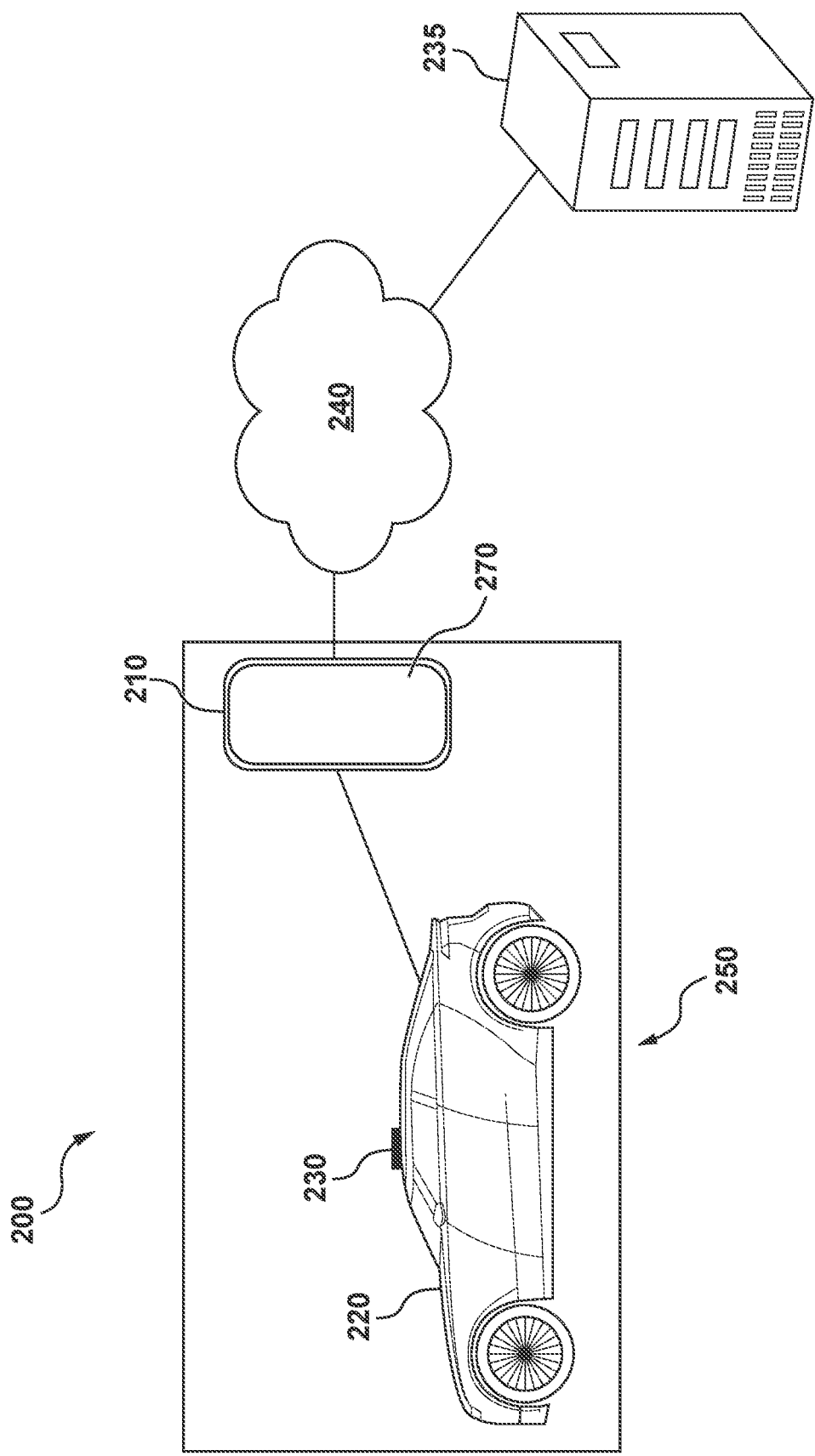
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who can operate the vehicle 220, a server 235 in communication with the electronic device 210 via a communication network 245 (e.g. the Internet or the like, as will be described in greater detail herein below).

Optionally, the networked computer environment 200 can also include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220 to which the electronic device 210 is associated may comprise any leisure or transportation vehicle such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated or a driver-less vehicle. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, solid-state drive 120 and the memory 130. In other words, the electronic device 210 comprises hardware and/or software and/or firmware, or a combination thereof, for processing data as will be described in greater detail below.

Radar System

In accordance to the non-limiting embodiments of the present technology, the electronic device 210 further comprises or has access to a radar system 230 that, broadly speaking, is configured to capture radar data about at least a portion of a surrounding area 250 of the vehicle 220. The radar system 230 is communicatively coupled to the processor 110 for transmitting the so-captured radar data to the processor 110 for processing thereof, as will be described in greater detail herein below.

In one non-limiting example, the radar system 230 may comprise an antenna (not depicted) and a transceiver (not depicted). How the radar system 230 is implemented depends on inter alia various implementations of the present technology. For example, in non-limiting embodiments of the present technology, the radar system 230 may be implemented with a directional-type antenna.

Broadly speaking, directional-type antennas radiate and receive energy in specific directions. This allows to improve transmission and reception functionalities of such antennas in those specific directions, and to reduce interference from unwanted sources in other directions. It should be noted that antennas have a "radiation pattern" that generally refers to a directional dependence of the strength of radio waves emitted by the given antenna. In a case of a directional-type antenna, for example, this radiation pattern is usually in a form of "lobes" in various directions.

Figure 3:
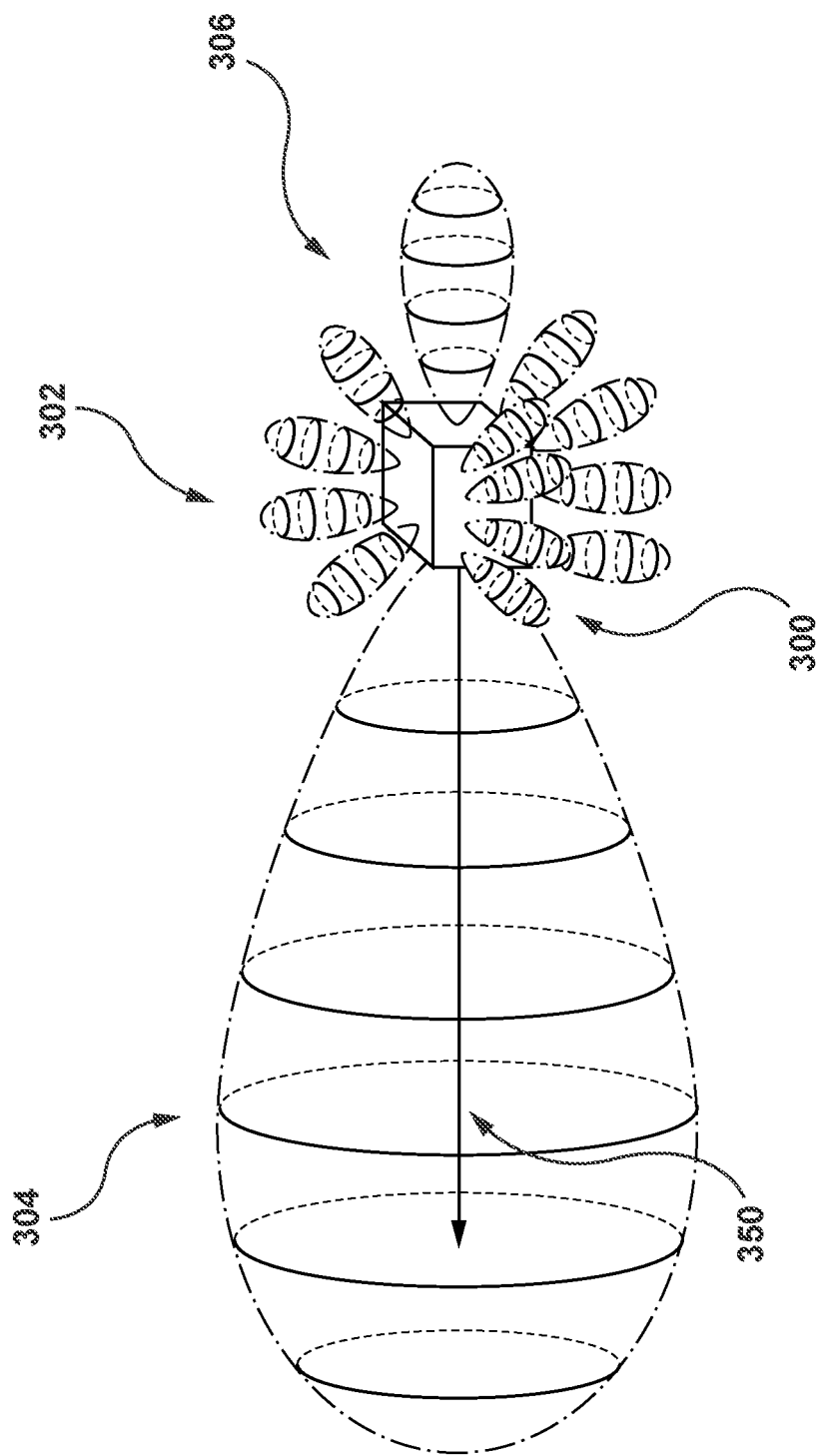
FIG. 3 depicts a radiation pattern of a directional-type antenna used as part of a radar system of FIG. 2, in accordance with the non-limiting embodiments of the present technology.

In order to better illustrate this, in FIG. 3 there is depicted a directional-type antenna 300. The directional-type antenna 300 has a radiation pattern 302 in a form of lobes. The radiation pattern 302 has a main lobe 304 that extends along the specific direction of the directional-type antenna 300 in which, in a sense, "wanted" radiation of the directional-type antenna 300 is to be emitted. The radiation pattern 302 also has side lobes (including a back lobe 306) which extend along directions in which, in a sense, "unwanted" radiation of the directional-type antenna 300 may potentially be emitted.

It should be noted that the directional-type antenna 300 has a boresight axis 350 that corresponds to an axis of maximum gain (e.g., maximum radiated power) of the directional-type antenna 300. This boresight axis 350 extends in the specific direction of the directional-type antenna 300 and the main lobe 304 of the radiation pattern 302 is symmetrical about the boresight axis 350.

In most cases, a given boresight axis is determined by the shape of a given directional-type antenna and may not be adjustable (although it should be noted that phased array antennas can electronically adjust the angle of their boresight axis by shifting the relative phase of radio waves emitted by different antenna elements thereof and/or may have multiple boresight axes, for example).

Returning to the description of FIG. 2, as mentioned above, in addition to the antenna, the radar system 230 comprises the transceiver which is communicatively coupled to the antenna (e.g., by way of wires, fiber-optics, wave-guides, and the like, or any combination thereof). The antenna and the transceiver allow the radar system 230 to capture and collect radar data about at least a portion of the surrounding area 250 of the vehicle 220. In some embodiments, it is contemplated that the radar system 230 may capture and collect radar data about at least a portion of the surrounding area 250 of the vehicle 220, which portion is in a particular direction from the radar system 230. Although it will be described in more details herein below, the radar data captured and collected by the radar system 230 may be used by the electronic device 210 for controlling/manoeuvring the vehicle 220.

The radar system 230 can be mounted on an interior, upper portion of a windshield of the vehicle 220, but other locations are within the scope of the present disclosure, including on a back window, side windows, front hood, rooftop, front grill, or front bumper of the vehicle 220. In some non-limiting embodiments of the present technology, the radar system 230 can be mounted in a dedicated enclosure (not depicted) mounted on the top of the vehicle 220.

It should be noted that a verity of sensors and systems may be implemented in combination with the radar system 230 on the vehicle 220 in some embodiments of the present technology. For example, camera-type sensors may be mounted to the vehicle 220 and be communicatively coupled to the processor 110. In another example, LIDAR-type systems may be mounted to the vehicle 220 and be communicatively coupled to the processor 110. As such, the vehicle 220 is depicted in FIG. 2 for the sake of simplicity as having only the radar system 230, however in other embodiments, the vehicle 220 may be implemented with additional sensors and systems to the radar system 230, without departing from the scope of the present technology.

The radar system 230 is calibratable.

In a first case, the radar system 230 may undergo an "intrinsic calibration". Broadly speaking, intrinsic calibration refers to techniques that may be used to ensure that the radar system 230 is functioning properly and that the radar data is accurately captured and collected. Put another way, "intrinsic calibration" may be performed to ensure that the radar data is not itself biased due to the radar system 230 malfunctioning or functioning abnormally. Intrinsic calibration is typically performed initially during the manufacturing of the radar system 230. Intrinsic calibration of the radar system 230 may also potentially be performed during retrofitting of the vehicle 220 with the radar system 230.

In some embodiments of the present technology, it contemplated that the radar system 230 may also undergo an "extrinsic calibration". Broadly speaking, extrinsic calibration refers to techniques that may be used to ensure that the radar data is properly used by other systems. This means that, even though the radar system 230 is functioning properly (for example, the radar system 230 having underwent a successful intrinsic calibration), the radar data thereof may be (although being unbiased itself) biasedly used by other systems due to a variety of factors.

Hence, extrinsic calibration is not used to compensate for the malfunctioning or abnormal functioning of the radar system 230 per se, but rather to compensate for at least some of the variety of factors due to which the radar data of the radar system 230 may be biasedly used by the other systems.

As it will become apparent from the description herein below, developers of the present technology have devised methods and devices for performing extrinsic calibration of the radar system 230. Which factor(s) may be compensated via the methods and devices devised by the developers of the present technology and how they may allow performing extrinsic calibration of the radar system 230 will be described in greater details herein further below.

Communication Network

In some embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

Server

In some embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

Figure 4:
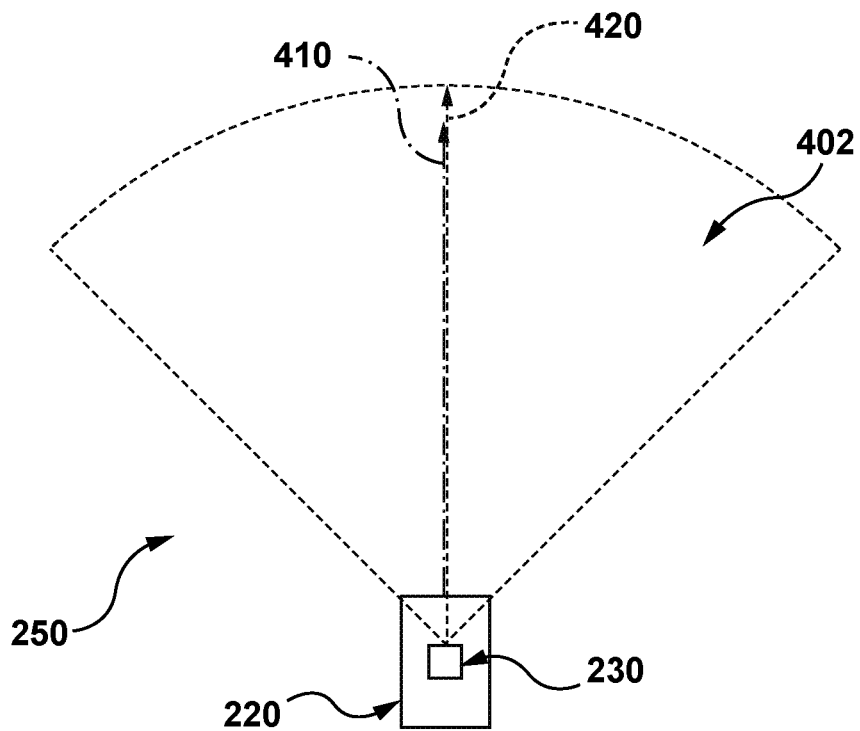
FIG. 4 depicts a radar system of FIG. 2 equipped to a vehicle of FIG. 2 in accordance with a target relationship between a scanning direction of the radar system and a forward direction of the vehicle, in accordance with the non-limiting embodiments of the present technology.
Figure 5:
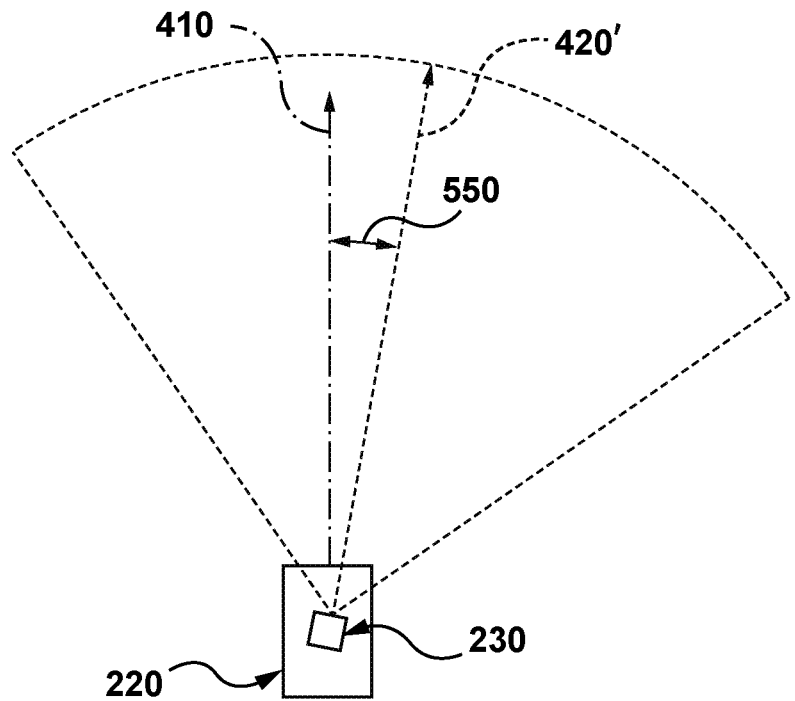
FIG. 5 depicts the radar system equipped to the vehicle in accordance with a current relationship between the scanning direction and the forward direction, in accordance with the non-limiting embodiments of the present technology.

With reference to FIGS. 4 and 5, at least some factor(s) that may need to be compensated by extrinsic calibration of the radar system 230 will now be discussed.

FIG. 4 depicts an ideal situation where the radar system 230 is equipped to the vehicle 220 in a particular manner. To begin with, the radar system 230 is mounted on top of the vehicle 220.

The vehicle 220 is associated with a forward direction 410 in which the vehicle 220 travels during operation. This means that when the vehicle 220 is travelling strictly forward, the vehicle 220 is traveling strictly along the forward direction 410. It is contemplated that in some embodiments, the forward direction 410 may coincide with a longitudinal axis of the frame of the vehicle 220.

The radar system 230 is associated with (i) a scanning direction 420, and (ii) a field-of-view 402. For example, the scanning direction 420 may coincide with a boresight axis of the antenna of the radar system 230, while the field-of-view 402 may correspond to a projection of a main lobe of a radiation pattern of the antenna of the radar system 230. Put another way, the radar system 230 may be mounted on top of the vehicle 220 such that the radar system 230 captures radar data that is generally located in the scanning direction 420 and in the field-of-view 402.

It should be noted that the radar system 230 is mounted on the vehicle 220 in accordance with a "target relationship" between (i) the scanning direction 420 of the radar system 230, and (ii) the forward direction 410 of the vehicle 220. This target relationship may be expressed in a form of one or more angle(s) between the scanning direction 420 and the forward direction 410. For example, the target relationship may be expressed in a form of a horizontal angle (e.g., azimuthal angle) and/or a vertical angle (e.g., zenithal angle).

For the sake of simplicity only, this target relationship is expressed herein solely in a form of a horizontal angle (e.g., azimuthal angle). However, it is contemplated that in other embodiments of the present technology, the target relationship may be expressed in a form of a horizontal angle (e.g., azimuthal angle) and/or a vertical angle (e.g., zenithal angle), without departing from the scope of the present technology.

In some cases, as depicted in FIG. 4 for example, the radar system 230 is mounted on the vehicle 220 such that the scanning direction 420 and the forward direction 410 coincide or, in other words, that a target azimuthal angle (e.g., the target relationship) between the scanning direction 420 and the forward direction 410 is "0" degrees. However, it is contemplated that the radar system 230 may be mounted on the vehicle 220 in accordance with a given target azimuthal angle other than "0" degrees.

Broadly speaking, the electronic device 210 (see FIG. 1) may use radar data in combination with data indicative of this target relationship for controlling/manoeuvring the vehicle 220 during operation. For example, the electronic device 210 may (i) receive radar data, (ii) receive data indicative of the target relationship (e.g., the target azimuthal angle), and (iii) use them in combination for controlling/manoeuvring the vehicle 220 during operation.

Developers of the present technology have realized that during operation of the vehicle 220, this target relationship between the scanning direction 420 and the forward direction 410 may inadvertently change. In one non-limiting example, the vehicle 220 may encounter a "bump" on the road upon which it is travelling. Travelling over this "bump" may displace the radar system 230 with respect to the vehicle 220 which results in an inadvertent change of the relationship between the scanning direction 420 and the forward direction 410. It should be noted that other factors, such as weather for example, may affect this relationship during operation of the vehicle 220.

In order to better illustrate this, let it be assumed that as depicted in FIG. 4, the target relationship is "0" degrees or, in other words, that the target azimuthal angle between the scanning direction 420 and the forward direction 410 is "0" degrees. Put another way, let it be assumed that the target relationship is that the scanning direction 420 and the forward direction 410 coincide.

Let it also be assumed that, at a given moment in time, the vehicle 220 travelled over a "bump" which displaced the radar system 230 with respect to the vehicle 220. This may result in an inadvertent change of the relationship between the scanning direction 420 and the forward direction 410.

As seen in FIG. 5, the radar system 230 currently moved (at the given moment in time) relatively to the vehicle 220 and now has a current scanning direction 420', instead of the scanning direction 420. It should be noted that the radar system 230 has (at the given moment in time) the current scanning direction 420' due to the movement of the radar system 230 relative to the vehicle 220, and not due to a malfunction or abnormal function of internal components of the radar system 230.

As a result, the target relationship inadvertently changed—that is, the current scanning direction 420' is no longer at an azimuthal angle of "0" degrees with the forward direction 410, but rather is at a current azimuthal angle 550 with the forward direction 410. In other words, a current relationship (at the given moment in time) between the current scanning direction 420' and the forward direction 410 corresponds to the current azimuthal angle 550.

It should be noted that using radar data at the given moment in time in combination with the target relationship, instead of the current relationship, may result in the radar data being biasedly used by electronic device 210 for controlling/manoeuvring the vehicle 220. This bias is due to an "offset" between the target relationship and the current relationship. Put another way, this bias is due to the "angular offset" between the target azimuthal angle and the current azimuthal angle 550. It should be noted that in this particular non-limiting example, since the target azimuthal angle is "0" degrees, this angular offset is equal to the current azimuthal angle 550.

Developers of the present technology have devised methods and devices for performing extrinsic calibration of the radar system 230 for compensating for the abovementioned offset between the target relationship and the current relationship. Again, as explained above, the extrinsic calibration is not used to compensate for malfunctioning or abnormal functioning of the radar system 230, but rather to compensate for other factors (such as an inadvertently changing relationship between a given scanning direction and a given forward direction, for example) so that radar data is not biasedly used by the electronic device 210 for controlling/manoeuvring the vehicle 220.

Thus, it can be said that developers of the present technology have devised methods and devices for determining the current relationship between the current scanning direction 420' and the forward direction 410. It is contemplated that current relationships between scanning directions and forward directions may be continuously determined, in real-time, during operation of the vehicle 220 (when possible). In some embodiments, this may allow the electronic device 210 to continuously compensate, in real time, for offsets between the target relationship and current relationships during the operation of the vehicle 220.

In some embodiments of the present technology, there are provided methods and systems for determining an angular offset between (i) the target azimuthal angle between the scanning direction 420 and the forward direction 410, and (ii) the current azimuthal angle 550.

Again, as mentioned above, in the particular non-limiting examples of FIGS. 4 and 5, since the target azimuthal angle is "0" degrees, the angular offset is equal to the current azimuthal angle 550. As such, in some embodiments of the present technology, there are provided methods and systems for determining the current azimuthal angle 550.

How the electronic device 210 may be configured to determine the current azimuthal angle 550 will now be described in greater details. However, prior to that, it should be noted that as alluded to above, a relationship between a given scanning direction and a given forward direction is expressed herein solely in a form of an azimuthal angle, for the sake of simplicity only. Nevertheless, in other embodiments of the present technology, this relationship may be expressed in a form of a given azimuthal angle and/or a given zenithal angle. Hence, it should be noted that a current zenithal angle between a given scanning direction and a given forward direction may be determined by the electronic device 210 similarly to how the current azimuthal angle 550 is determined.

Figure 6:
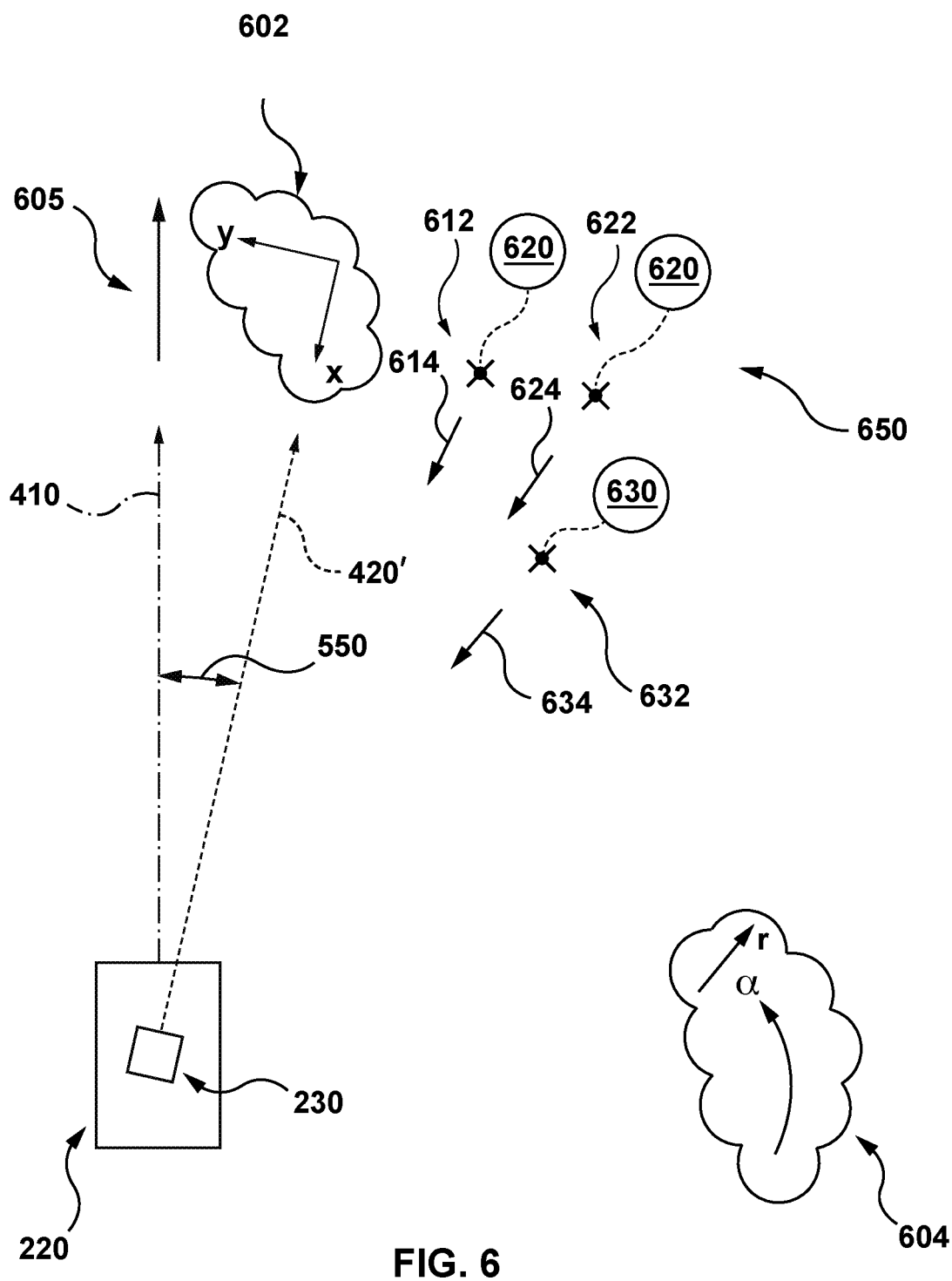
FIG. 6 depicts the radar system equipped to the vehicle in accordance with a current relationship and detected objects by the radar system, in accordance with the non-limiting embodiments of the present technology.
Figure 7:
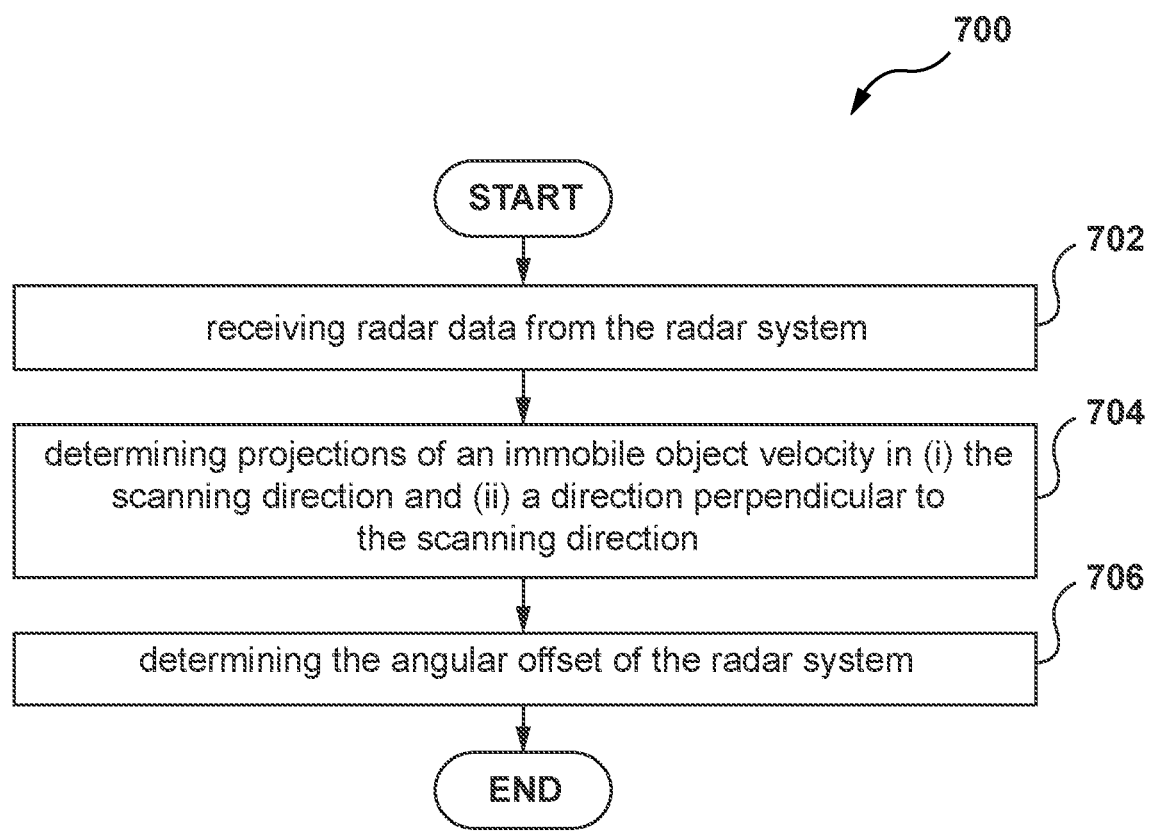
FIG. 7 depicts a flow chart of a method, the method executable in the system of FIG. 2, in accordance with the non-limiting embodiments of the present technology.

With reference to FIG. 6, there is depicted the vehicle 220 with the radar system 230 at the given moment in time. As mentioned above, at the given moment in time, there is the current azimuthal angle 550 between the forward direction 410 and the current scanning direction 420'.

It should be noted that, at the given moment in time, the vehicle 220 is traveling in the forward direction 410 in accordance with a vehicle velocity 605. In some embodiments of the present technology, it is contemplated that the vehicle 330 may be travelling strictly in the forward direction 410 in accordance with the vehicle velocity 605 at the given moment in time. This means that the direction of the vehicle velocity 605 may coincide with the forward direction 410.

At the given moment in time, the radar system 230 may capture radar data 650. The radar data 650 includes point-specific data associated with a plurality of detected objects. For example, the radar data 650 includes first point-specific data 610 associated with a first detected object 612, second point-specific data 620 associated with a second detected object 622, and third point-specific data 630 associated with a third detected object 632.

It should be noted that point-specific data of a given detected object is indicative of (i) a position of the respective detected object, and (ii) an actual radial speed of the respective detected object. For example, the first point-specific data 610 is indicative of (i) a position of the first detected object 612, and (ii) a first actual radial speed 614 of the first detected object 612. Similarly, the second point-specific data 620 is indicative of (i) a position of the second detected object 622, and (ii) a second actual radial speed 624 of the second detected object 622. Also, the third point-specific data 630 is indicative of (i) a position of the third detected object 632, and (ii) a third actual radial speed 634 of the third detected object 632.

In some embodiments of the present technology, a position of a given detected object may be detected by the radar system 230 in spherical coordinates 604. For example, the position of a given detected object i may be detected by the radar system 230 in a form of (i) a distance $r_i$ from the radar system 230, and (ii) an azimuthal angle $\alpha_i$ from the current scanning direction 420'.

In other embodiments of the present technology, a position of a given detected object may be expressed in cartesian coordinates 602. For example, the position of a given detected object i may be expressed in a form of (i) a distance $x_i$ from the radar system 230 along an "x-axis" which coincides with the current scanning direction 420', and (ii) a distance $y_i$ from the radar system 230 along the "y-axis" which is perpendicular to the current scanning direction 420'.

It is contemplated that the position of a given detected object from the radar data 650 may be in any one of the spherical coordinates 604 and the cartesian coordinates 602, without departing from the scope of the present technology. This means that the position of a given detected object may be detected in the spherical coordinates 604 and may be used in the cartesian coordinates 602 in accordance with following equations (1) and (2):

$$x_i = r_i * \cos(\alpha_i) \quad (1)$$

$$y_i = r_i * \sin(\alpha_i) \quad (2)$$

In some embodiments of the present technology, an actual radial speed of a given detected object may be a "range-rate" value as detected by the radar system 230 for the given detected object. It is contemplated that an actual radial speed of a given detected object may be a "doppler speed" value detected by the radar system 230 for the given detected object.

It is also contemplated that in some embodiments of the present technology, as alluded to above, the vehicle 220 may be travelling strictly in the forward direction 410 at the given moment in time when the radar system 230 captures the radar data 650. Put another way, the radar data 650 may be captured at the given moment in time when the vehicle 220 is traveling strictly forward.

It should be noted that the plurality of detected objects of the radar data 650 correspond to objects in proximity of the vehicle 220. It should be noted that, one or more detected objects may correspond to a first object in proximity of the vehicle 220, while one or more other detected objects may correspond to a second object in proximity of the vehicle 220. It should also be noted that objects in proximity of the vehicle 220 may be immobile or mobile with respect to the surface on which the vehicle 220 is travelling. For example, if a given object is a road sign, the given object is an immobile object with respect to the surface on which the vehicle 220 is travelling. In another example, if a given object is a moving vehicle, the given object is a mobile (e.g., non-immobile) object with respect to the surface on which the vehicle 220 is travelling. In a further example, if a given object is a vehicle that is stopped, the given object is an immobile object with respect to the surface on which the vehicle 220 is travelling.

Hence, it is contemplated that in some embodiments of the present technology, at least one detected object of the radar data 650 may correspond to an immobile object. Also, it is contemplated that in other embodiments of the present technology, at least one other detected object of the radar data 650 may correspond to a mobile object. Developers of the non-limiting embodiments of the present technology have developed embodiments thereof based on their assumption that at a given moment in time, it may be assumed that a majority of detected objects correspond to immobile object(s).

In some embodiments of the present technology, the electronic device 210 is configured to determine which detected objects amongst the plurality of detected objects correspond to immobile object(s). In other words, the electronic device 210 may determine a subset of detected objects amongst the plurality of detected objects that correspond to at least one immobile object.

It should be noted that detected objects corresponding to immobile objects have, in a sense, a similar "behaviour" with respect to the surface on which the vehicle 220 is travelling, unlike detected objects corresponding to mobile objects. Mobile objects may be moving at different velocities with respect to the surface on which the vehicle 220 is travelling (such as, for example, they may be moving in different directions at different speeds). The immobile objects, however, all "behave" similarly with respect to the surface on which the vehicle 220 is travelling 13 that is, they are all immobile with respect to the surface on which the vehicle 220 is travelling.

As a result, detected objects that correspond to one or more immobile objects have a same velocity with respect to the vehicle 220, and more particularly, with respect to the radar system 230. Hence, it can be said that detected objects corresponding to one or more immobile objects have a same velocity with respect to the vehicle 220 and the radar system 230. It should be noted that it is not important whether these detected objects actually correspond to the same immobile object. What is important, however, is that these detected objects have a same velocity with respect to the vehicle 220 and the radar system 230.

Hence, it can be said that the subset of detected objects includes detected objects that are associated with an "immobile object velocity". Irrespective of whether the subset of detected objects corresponds to one immobile object or many immobile objects, since they corresponds to immobile objects, they are associated with the same immobile object velocity with respect to the vehicle 220 and the radar system 230.

It is contemplated that the immobile object velocity is derivable (at least partially) from actual radial speeds of detected objects in the subset of detected objects (detected objects corresponding to immobile object(s) as mentioned above). Therefore, it is contemplated that, in order to determine the immobile object velocity, the electronic device 210 may need to determine which detected objects of the radar data 650 correspond to immobile object(s).

It is contemplated that in some embodiments of the present technology, the electronic device 210 may be configured to simultaneously determine (i) the subset of detected objects corresponding to immobile object(s), and (ii) the immobile object velocity. It can also be said that the electronic device 210 may be configured to determine both (i) the subset of detected objects associated with immobile object(s), and (ii) the immobile object velocity by executing an iterative optimization algorithm (such as a RANSAC algorithm, for example). How the electronic device 210 is configured to determine both (i) the subset of detected objects corresponding to immobile object(s) and (ii) the immobile object velocity will now be described in greater details.

It should be noted that the electronic device 210 may be configured to determine the immobile object velocity by determining projections of the immobile object velocity in a system of coordinates defined by the "x-axis" and the "y-axis": (i) the current scanning direction 420' and (ii) the direction perpendicular to the current scanning direction 420'.

For example, the immobile object velocity may be denoted as $V_{imob}$, while (i) the projection of the immobile object velocity in the current scanning direction 420' may be denoted as $V_{imob\text{-}x}$ and (ii) the projection of the immobile object velocity in the direction perpendicular to the current scanning direction 420' may be denoted as $V_{imob\text{-}y}$. This means that the projection of the immobile object velocity in the current scanning direction 420' is the projection of the immobile object velocity onto the "x-axis" (which coincides with the current scanning direction 420') depicted in FIG. 6, while the projection of the immobile object velocity in the direction perpendicular to the current scanning direction 420' is the projection of the immobile object velocity onto the "y-axis" (which coincides with the direction perpendicular to the current scanning direction 420').

As alluded to above, a velocity of a given detected object is derivable (at least partially) from the actual radial speed associated with the given detected object. The velocity of the given detected object is, for example, derivable from the actual radial speed associated therewith in accordance with a following equation (3):

$$v_{x_i} * \frac{x_i}{r_i} + v_{y_i} * \frac{y_i}{r_i} = v_i \quad (3)$$

wherein: (i) $v_i$ is the actual radial speed of a given detected object i, (ii) $v_{x_i}$ is the projection of the velocity of the given detected object i in the current scanning direction 420' (coinciding with the "x-axis"), and (iii) $v_{y_i}$ is the projection of the velocity of the given detected object i in the direction perpendicular to the current scanning direction 420' (coinciding with the "y-axis").

Hence, respective velocities of the first detected object 612, the second detected object 622 and the third detected object 632 can be derived from following set of equations (4), (5) and (6), respectively:

$$v_{x_1} * \frac{x_1}{r_1} + v_{y_1} * \frac{y_1}{r_1} = v_1 \quad (4)$$

$$v_{x_2} * \frac{x_2}{r_2} + v_{y_2} * \frac{y_2}{r_2} = v_2 \quad (5)$$

$$v_{x_3} * \frac{x_3}{r_3} + v_{y_3} * \frac{y_3}{r_3} = v_3 \quad (6)$$

During a first iteration of the iterative optimization algorithm (for determining (i) the subset of detected objects associated with immobile object(s), and (ii) the immobile object velocity), it is assumed that all detected objects of the radar data 650 are associated with immobile object(s). Hence, it can be said that (i) the respective projections of velocities of the detected objects of the radar data 650 in the current scanning direction 420' are equal, and (ii) the respective projections of velocities of the detected objects of the radar data 650 in the direction perpendicular to the current scanning direction 420' are equal. Put another way, this initial assumption during the first iteration of the iterative optimization algorithm is in accordance with following equations (7) and (8):

$$v_{x_1} = v_{x_2} = v_{x_3} = V_{imob\text{-}cand\text{-}x} \quad (7)$$

$$v_{y_1} = v_{y_2} = v_{y_3} = V_{imob\text{-}cand\text{-}y} \quad (8)$$

wherein: (i) $V_{imob\text{-}cand\text{-}x}$ is a candidate projection of the immobile object velocity in the current scanning direction 420', and (ii) $V_{imob\text{-}cand\text{-}y}$ is a candidate projection of the immobile object velocity in the direction perpendicular to the current scanning direction 420'.

In some embodiments of the present technology, it is contemplated that the electronic device 210 may be configured to execute an Ordinary Least Squares (OLS) algorithm in order to determine values of $V_{imob\text{-}cand\text{-}x}$ and $V_{imob\text{-}cand\text{-}y}$ that, in a sense, "best fit" the set of equations (4), (5), (6), (7) and (8). Put another way, the electronic device 210 may be configured to determine (i) the candidate projection of the immobile object velocity in the current scanning direction 420', and (ii) the candidate projection of the immobile object velocity in the direction perpendicular to the current scanning direction 420' that, in accordance to the equations with the set of equations (4), (5), (6), (7) and (8), are "best" estimations of the projections of the immobile object velocity while assuming that all detected objects of the radar data 650 are associated with immobile object(s).

Once the electronic device 210 executes the OLS algorithm for determining (i) the candidate projection of the immobile object velocity in the current scanning direction 420' ($V_{imob\text{-}cand\text{-}x}$), and (ii) the candidate projection of the immobile object velocity in the direction perpendicular to the current scanning direction 420' ($V_{imob\text{-}cand\text{-}y}$), during the first iteration of the iterative optimization algorithm, the electronic device 210 may be configured to determine estimated radial speeds of detected objects of the radar data 650. The electronic device 210 may be configured to determine the estimated radial speeds of detected objects of the radar data 650 in accordance with following equations (9), (10), and (11):

$$V_{imob-cand-x} * \frac{x_1}{r_1} + V_{imob-cand-y} * \frac{y_1}{r_1} = v_{1-est} \quad (9)$$

$$V_{imob-cand-x} * \frac{x_2}{r_2} + V_{imob-cand-y} * \frac{y_2}{r_2} = v_{2-est} \quad (10)$$

$$V_{imob-cand-x} * \frac{x_3}{r_3} + V_{imob-cand-y} * \frac{y_3}{r_3} = v_{3-est} \quad (11)$$

wherein: (i) $v_{1-est}$ is the estimated radial speed of the first detected object 612, (ii) $v_{2-est}$ is the estimated radial speed of the second detected object 622, and (iii) $v_{3-est}$ is the estimated radial speed of the third detected object 632.

This means that, in accordance with the initial assumption that all detected objects of the radar data 650 are associated with immobile object(s), the detected objects of the radar data 650 should have radial speeds equal to the estimated radial speeds $v_{1-est}$, $v_{2-est}$, and $v_{3-est}$.

Once the electronic device 210 determines the estimated radial speeds $v_{1-est}$, $v_{2-est}$, and $v_{3-est}$, during the first iteration of the iterative optimization algorithm, the electronic device 210 may be configured to determine differences between the actual radial speeds and the estimated radial speeds of the respective detected objects of the radar data 650. This means that the electronic device 210 may be configured to determine radial speed estimation errors for respective detected objects of the radar data 650 in accordance with following equations (12), (13) and (14):

$$v_{1-est} - v_1 = \Delta v_1 \quad (12)$$

$$v_{2-est} - v_2 = \Delta v_2 \quad (13)$$

$$v_{3-est} - v_3 = \Delta v_3 \quad (14)$$

wherein: (i) $\Delta v_1$ is a radial speed estimation error for the first detected object 612, (ii) $\Delta v_2$ is a radial speed estimation error for the second detected object 622, and (iii) $\Delta v_3$ is a radial speed estimation error for the third detected object 632.

Once the radial speed estimation errors $\Delta v_1$, $\Delta v_2$, and $\Delta v_3$ are determined, during the first iteration of the iterative optimization algorithm, the electronic device 210 may be configured to compare the radial speed estimation errors $\Delta v_1$, $\Delta v_2$, and $\Delta v_3$ against a threshold.

It is contemplated that in some embodiments of the present technology, the threshold may be a pre-determined threshold. For example, the threshold may be determined by an operator of the electronic device 210 and/or of the server 235.

It is contemplated that based on the comparison of the radial speed estimation errors $\Delta v_1$, $\Delta v_2$, and $\Delta v_3$ against the threshold, different scenarios may occur and, as a result, the electronic device 210 may be configured to perform different steps based on the outcome of the comparison in question.

For example, in a first scenario, let it be assumed that the radial speed estimation errors $\Delta v_1$, $\Delta v_2$, and $\Delta v_3$ are all below the threshold. It is contemplated that in some embodiments of the present technology, if all of the radial speed estimation errors $\Delta v_1$, $\Delta v_2$, and $\Delta v_3$ are below the threshold, the electronic device 210 may determine (e.g., simultaneously) that:

(i) the first detected object 612, the second detected object 622, and the third detected object 632 correspond to immobile object(s);

(ii) the candidate projection of the immobile object velocity in the current scanning direction 420' $V_{imob-cand-x}$ is the projection of the immobile object velocity in the current scanning direction 420' $V_{imob-x}$; and (iii) the candidate projection of the immobile object velocity in the direction perpendicular to the current scanning direction 420' $V_{imob-cand-y}$ is the projection of the immobile object velocity in the direction perpendicular to the current scanning direction 420' $V_{imob-y}$.

In other words, it can be said that, if the radial speed estimation errors $\Delta v_1$, $\Delta v_2$, and $\Delta v_3$ are all below the threshold, this means that (i) the initial assumption of that all detected objects of the radar data 650 correspond to immobile object(s) is an acceptable assumption, and (ii) the $V_{imob-cand-x}$ and $V_{imob-cand-y}$ are acceptable estimations of $V_{imob-x}$ and $V_{imob-y}$, respectively.

In a second scenario, let it be assumed that the radial speed estimation error $\Delta v_1$, and $\Delta v_3$ are below the threshold, while the radial speed estimation error $\Delta v_2$ is above the threshold. In this second scenario, the electronic device 210 may determine that the second detected object 622 (associated with the radial speed estimation error $\Delta v_2$) corresponds to a non-immobile (e.g., mobile) object. Put another way, the electronic device 210 may determine that the second detected object 622 does not correspond to an immobile object.

Therefore, the electronic device 210 may be configured to remove the second detected object 622 from the plurality of detected objects of the radar data 650 for a next iteration of the iterative optimization algorithm. Put another way, the electronic device 210 thereby may be configured to generate a reduced set of detected objects that comprises the first detected object 612 and the third detected object 632 for use during the next iteration of the iterative optimization algorithm.

In some embodiments of the present technology, the electronic device 210 may perform a second iteration of the iterative optimization algorithm based on the reduced set of detected objects, instead of using all detected objects of the radar data 650 (as during the first iteration thereof). The electronic device 210 may be configured to perform the second iteration of the iterative optimization algorithm based on the reduced set of detected objects similarly to how the electronic device 210 is configured to perform the first iteration of the iterative optimization algorithm based on the plurality of detected objects of the radar data 650.

It should be noted that the electronic device 210 may be configured to perform as many iterations of the iterative optimization algorithm as needed. Put another way, the electronic device 210 may be configured to perform iterations of the iterative optimization algorithm until the radial speed estimation errors of all detected objects that are left in the so-iteratively-reduced set of detected objects are below the threshold.

Hence, it is contemplated that in some embodiments of the present technology, the electronic device 210 may be configured to perform the iterations of the iterative optimization algorithm until a pre-determined condition is met (e.g., the radial speed estimation errors of all detected objects that are left in the so-iteratively-reduced set of detected objects are below the threshold).

Let it be assumed that the pre-determined condition is met during the Nth iteration of the iterative optimization algorithm. This means that the detected objects that are left in the iteratively-reduced set of detected objects of the Nth iteration correspond to immobile object(s). This also means that:

$$V_{imob-cand-x}^{(N)} = V_{imob-x} \quad (15)$$

$$V_{imob-cand-y}^{(N)} = V_{imob-y} \quad (16)$$

wherein: (i) $V_{imob\text{-}cand\text{-}x}^{(N)}$ is the candidate projection of the immobile object velocity in the scanning direction 420' of the Nth iteration of the iterative optimization algorithm, and (ii) $V_{imob\text{-}cand\text{-}y}^{(N)}$ is the candidate projection of the immobile object velocity in the direction perpendicular to the scanning direction 420' of the Nth iteration of the iterative optimization algorithm.

In some embodiments of the present technology, the electronic device 210 may be configured to determine the current azimuthal angle 550 based on (i) the vehicle velocity 605 and (ii) $V_{imob\text{-}x}$ and $V_{imob\text{-}y}$. It should be noted that, assuming that at the given moment in time the vehicle 220 is travelling strictly forward, the immobile object velocity is opposite to the vehicle velocity 605 at the given moment in time. Hence, the electronic device 210 may be configured to determine the current azimuthal angle 550 in accordance with following equation (17):

$$\theta = \pi - \arctan 2(V_{imob\text{-}y}, V_{imob\text{-}x}) \quad (17)$$

wherein: $\theta$ is the current azimuthal angle 550. In other embodiments of the present technology, the electronic device 210 may be configured to determine the current azimuthal angle 550 by using (i) at least one of the $V_{imob\text{-}x}$ and $V_{imob\text{-}y}$ and (ii) the velocity 605. It is contemplated that other equations may be used by the electronic device 210 to determine the current azimuthal angle 550 when the velocity 605, $V_{imob\text{-}x}$ and $V_{imob\text{-}y}$ are known.

However, it is contemplated that, before using the (i) $V_{imob\text{-}cand\text{-}x}^{(N)}$ as the projection of the immobile object velocity in the current scanning direction 420' and (ii) $V_{imob\text{-}cand\text{-}y}^{(N)}$ as the projection of the immobile object velocity in the direction perpendicular to the current scanning direction 420', the electronic device 210 may be configured to verify other conditions associated with the subset of detected objects.

In one embodiment, the electronic device 210 may be configured to verify whether the subset of detected objects corresponding to immobile object(s) includes at least a pre-determined proportion of detected objects from the plurality of detected objects of the radar data 650. For example, assuming the pre-determined proportion has been determined by the operator of the electronic device 210 and/or the server 235 as being 50%, the electronic device 210 may be configured to verify whether the subset of detected objects corresponding to immobile object(s) includes at least 50% of detected objects from the plurality of detected objects of the radar data 650.

It is contemplated that, in some embodiments, if the subset of detected objects does not include at least the pre-determined proportion of detected objects from the plurality of detected objects, the electronic device 210 may determine that the candidate projections of the immobile object velocity determined for the subset of detected objects are not an acceptable estimation of the projections of the immobile object velocity. Nevertheless, the electronic device 210 may be configured to repeat the above-mentioned process at another given moment in time for determining the angular offset at that another given moment in time.

In another embodiment, the electronic device 210 may be configured to verify whether the subset of detected objects corresponding to immobile object(s) includes at least a pre-determined number of detected objects. For example, assuming the pre-determined number has been determined by the operator of the electronic device 210 and/or the server 235 as being 50 detected objects, the electronic device 210 may be configured to verify whether the subset of detected objects corresponding to immobile object(s) includes at least 50 detected objects.

It is contemplated that, in some embodiments, if the subset of detected objects does not include at least the pre-determined number of detected objects, the electronic device 210 may determine that the candidate projections of the immobile object velocity determined for the subset of detected objects are not an acceptable estimation of the projections of the immobile object velocity. Nevertheless, the electronic device 210 may be configured to repeat the above-mentioned process at another given moment in time for determining the angular offset at that another given moment in time.

In some embodiments of the present technology, there is provided a method 700 of determining a given angular offset of a given radar system (having a given scanning direction) mounted on a given vehicle (having a given forward direction of travel along a surface), and where the given angular offset is an angle between the given scanning direction and the given forward direction.

The method 700 is executable by a given computer device. In some embodiments of the present technology, the given computer device may be the electronic device 210 and/or the server 235. The method 700 will now be described in greater details.

Step 702: Receiving Radar Data from the Radar System

The method 700 begins at step 702 with the computer device receiving radar data 650 from the radar system 230, the radar data 650 including point-specific data associated with a plurality of detected objects. For example, the first point-specific data 610 is indicative of (i) the position of the first detected object 612, and (ii) the actual radial speed of first detected object 612.

In some embodiments, it is contemplated that the radar data 650 may be captured when the vehicle 220 is travelling along the forward direction 410 of travel at the vehicle velocity 605 of the vehicle 220. It is contemplated that, in some embodiments of the present technology, the electronic device 210 may be configured to monitor the vehicle velocity 605 of the vehicle 220, and at a given moment in time when the computer device determines that the vehicle 220 is travelling along the forward direction 410, the computer device may begin the method 700 with receiving the radar data 650 captured at that given moment in time.

In other embodiments, it is contemplated that the radar data 650 may be captured when the vehicle velocity 605 of the vehicle 220 is substantially constant. It is contemplated that, in some embodiments of the present technology, the electronic device 210 may be configured to monitor the vehicle velocity 605 of the vehicle 220, and at a given moment in time when the computer device determines that the vehicle velocity 605 of the vehicle 220 is substantially constant (e.g., that the vehicle 220 is not accelerating or decelerating at the given moment in time), the computer device may begin the method 700 with receiving the radar data 650 captured at that given moment in time.

In some embodiments, the portion of a given detected object may be expressed in at least one of spherical coordinates 604 and Cartesian coordinates 602 as depicted in FIG. 6. It is contemplated that the actual radial speed of a given detected object may be a doppler speed of the given detected object as determined by the radar system 230.

Step 704: Determining Projections of an Immobile Object Velocity in (i) the Scanning Direction and (ii) a Direction Perpendicular to the Scanning Direction The method 700 continues to step 704 with the computer device configured to determine projections of an immobile object velocity in (i) the scanning direction (the current scanning direction 420' of the radar system 230) and (ii) a direction perpendicular to the scanning direction (a direction perpendicular to the current scanning direction 420' of the radar system 230).

The immobile object velocity is associated with the subset of detected objects of the plurality of detected objects, and the subset of detected objects corresponds to at least one object that is immobile with respect to the surface (on which the vehicle 220 is travelling).

It is contemplated that, for determining the projections of the immobile object velocity, the computer device may be configured to determine candidate projections of velocity (i) in the scanning direction (the current scanning direction 420') and (ii) in the direction perpendicular to the scanning direction (the direction perpendicular to the current scanning direction 420') for the plurality of detected objects of the radar data 650 based on the point-specific data of the plurality of detected objects in the radar data 650.

It is contemplated that the computer device may be configured to use these candidate projections of velocity and the respective positions of the plurality of detected objects to determine respective estimated radial speeds for the plurality of detected objects.

It is contemplated that, the computer device may be configured to, in response to a difference between (i) the estimated radial speeds of the plurality of detected objects and (ii) the actual radial speeds of the plurality of detected objects being below a given threshold, determine that the plurality of detected objects is the subset of detected objects and that these candidate projections (determined for the plurality of detected objects) are the projections of the immobile object velocity.

In some embodiments, the computer device may be configured to determine the respective estimated radial speeds for the plurality of detected objects by applying a following equation:

$$V_{imob-cand-x} * \frac{x_i}{r_i} + V_{imob-cand-y} * \frac{y_i}{r_i} = v_{i-est} \tag{18}$$

In some embodiments, it is contemplated that in response to the difference between (i) the estimated radial speed of a given detected object and (ii) the actual radial speed of the given detected object being above the threshold, the computer device may be configured to remove the given detected object from the plurality of detected objects thereby generating a reduced set of detected objects. This given detected object may correspond to a non-immobile object with respect to the surface.

As a result, the computer device may be configured to repeat the process performed on the plurality of detected objects described above on the reduced set of detected objects. Hence, it is contemplated that the determining the projections of the immobile object velocity is performed by the computer device employing an iterative optimization algorithm. In some embodiments, the iterative optimization algorithm may be a RANSAC algorithm. Also, it is contemplated that during a given iteration of the iterative optimization algorithm, respective candidate projections may be determined by the computer device employing an OLS algorithm.

For example, during the first iteration of the iterative optimization algorithm as described above, the OLS algorithm may be employed on the set of equations (4), (5), (6), (7) and (8) thereby determining candidate projections that, in a sense, "best fit" the set of equations (4), (5), (6), (7) and (8).

Step 706: Determining the Angular Offset of the Radar System

The method 700 continues to step 706 with the computer device determining the angular offset (the current angular offset 550) of the radar system 230 based on at least one of the projections of the immobile object velocity.

It is contemplated that the computer device may be configured to determine the current angular offset 550 based on (i) the vehicle velocity 605 of the vehicle 220 and at least one of (ii) the projections of the immobile object velocity. It is also contemplated that the computer device may be configured to determine the current angular offset 550 based on both projections of the immobile object velocity.

It is contemplated that the computer device may determine this angular offset by applying the equation (17).

In some embodiments of the present technology, the computer device may be configured to determine a given current angular offset of the radar system 230 at a plurality of moments in time. In fact, it is contemplated that the computer device may determine current angular offsets in a continuous manner.

Furthermore, it is contemplated that as explained above, once the current angular offset 550 is determined, the computer device may be configured to perform extrinsic calibration of the radar system 230 based on the current angular offset 550. Hence, it is contemplated that the computer device may be configured to perform extrinsic calibration of the radar system 230 in a continuous manner based on the current angular offsets determined by the computer device in a continuous manner.

For example, in some embodiments of the present technology, the computer device may be configured to repeatedly perform the method 700. As a result, the computer device may be configured to repeatedly determine current angular offsets of the radar system 230 at respective moments in time. It is contemplated that the computer device may also perform repeatedly extrinsic calibration based on the respective current angular offsets of the radar system 230.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of calibrating a radar system based on an angular offset, the radar system having been mounted on a vehicle, the vehicle having a forward direction of travel along a surface, the radar system having a scanning direction, the angular offset being an angle between the scanning direction and the forward direction, the method executable by a computer device, the computer device being communicatively coupled to the radar system, the method comprising:
- at a given moment in time during operation of the radar system:
  - receiving radar data from the radar system, the radar data including point-specific data associated with a plurality of detected objects,
    - the point-specific data associated with a given detected object being indicative of (i) a position of the given detected object, and (ii) an actual radial speed of the given detected object;
  - determining, by the computer device, projections of an immobile object velocity in (i) the scanning direction and (ii) a direction perpendicular to the scanning direction by using an iterative process,
    - the immobile object velocity being associated with a subset of detected objects of the plurality of detected objects, the plurality of detected objects including detected objects that are immobile with respect to the surface and at least one detected object that is non-immobile with respect to the surface, the subset of detected objects having a plurality of objects that are immobile with respect to the surface, the projections of the immobile object velocity being derivable from the actual radial speed of the respective ones of the subset of detected objects,
  - the determining the projections of the immobile object velocity including:
    - during a given iteration of the iterative process:
      - determining candidate projections of velocity (i) in the scanning direction and (ii) in the direction perpendicular to the scanning direction, for the plurality of detected objects based on the point-specific data of the plurality of detected objects;
      - using the candidate projections of velocity and the respective positions of the plurality of detected objects to determine respective estimated radial speeds for the plurality of detected objects;
      - in response to a difference between (i) the estimated radial speeds of the plurality of detected objects and (ii) the actual radial speeds of the plurality of detected objects being above a threshold,
        - removing the given detected object from the plurality of detected objects thereby generating a reduced set of detected objects, the given detected object corresponding to a non-immobile object with respect to the surface;
    - during a following iteration of the iterative process:
      - determining new candidate projections of velocity (i) in the scanning direction and (ii) in the direction perpendicular to the scanning direction, for the reduced set of detected objects based on the point-specific data of the reduced set of detected objects;
      - using the new candidate projections and the respective positions of the reduced set of detected objects to determine respective new estimated radial speeds for the reduced set of detected objects;
      - in response to differences between (i) the respective new estimated radial speeds of the reduced set of detected objects and (ii) the respective actual radial speeds of the reduced set of detected objects being below the threshold,
        - determining that the reduced set of detected objects is the subset of detected objects and that the new candidate projections are the projections of the immobile object velocity;
  - determining, by the computer device, the angular offset of the radar system based on at least one of the projections of the immobile object velocity; and
  - performing, by the computer device, calibration of the radar system based on the angular offset.

2. The method of claim 1, wherein the method comprises determining the respective estimated radial speeds for the plurality of detected objects by applying a following equation:

$$V_{imob-cand-x} * \frac{x_i}{r_i} + V_{imob-cand-y} * \frac{y_i}{r_i} = v_{i-est}$$

3. The method of claim 1, wherein the determining the angular offset of the radar system is performed by applying a following equation:

$$\theta = \pi - \operatorname{atan} 2(V_{imob-y}, V_{imob-x})$$

4. The method of claim 1, wherein the radar data is captured when the vehicle is travelling along the forward direction of travel at the velocity of the vehicle.

5. The method of claim 4, wherein the velocity of the vehicle is substantially constant.

6. The method of claim 4, wherein the forward direction is a strict forward direction.

7. The method of claim 1, wherein the position of a given detected object is at least one of:
- (i) a distance of the given detected object from the radar system, and (ii) a horizontal angle of the given detected object with the scanning direction of the radar system; and
- a distance of the given detected object from the radar system (i) in the scanning direction, and (ii) in the direction perpendicular to the scanning direction.

8. The method of claim 1, wherein the actual radial speed of a given detected object is a doppler speed of the given detected object as determined by the radar system.

9. The method of claim 1, wherein the determining the projections of the immobile object velocity is performed by the computer device employing an iterative optimization algorithm.

10. The method of claim 1, wherein the determining the candidate projections of velocity is performed by the computer device employing an Ordinary Least Squares (OLS) algorithm.

11. The method of claim 10, wherein the OLS algorithm is employed on a following set of equations:

$$v_{x_1} * \frac{x_1}{r_1} + v_{y_1} * \frac{y_1}{r_1} = v_1$$

$$v_{x_2} * \frac{x_2}{r_2} + v_{y_2} * \frac{y_2}{r_2} = v_2$$

$$v_{x_3} * \frac{x_3}{r_3} + v_{y_3} * \frac{y_3}{r_3} = v_3$$

$$v_{x_1} = v_{x_2} = v_{x_3} = V_{imob-cand-x}$$

$$v_{y_1} = v_{y_2} = v_{y_3} = V_{imob-cand-y}$$

12. The method of claim 1, wherein the subset of detected objects includes at least a pre-determined portion of detected objects of the plurality of detected objects.

13. The method of claim 12, wherein the method further comprises verifying, by the computer device, that the subset of detected objects includes at least the pre-determined portion of detected objects of the plurality of detected objects.

14. The method of claim 1, wherein the subset of detected objects includes at least a pre-determined number of detected objects.

15. The method of claim 14, wherein the method further comprises verifying, by the computer device, that the subset of detected objects includes at least the pre-determined number of detected objects.

16. The method of claim 1, wherein the determining the angular offset of the radar system is executed in response to the subset of detected objects including at least one of:
   at least a pre-determined portion of detected objects of the plurality of detected objects; and
   at least a pre-determined number of detected objects.

17. The method of claim 1, wherein the determining the projections of the immobile object velocity comprises:
   iteratively determining, by the computer device, candidate projections based on the point-specific data of respective iteratively-reduced sets of detected objects.

18. The method of claim 17, wherein detected objects from the subset of detected objects have substantially similar movement patterns relative to the radar system.

19. The method of claim 18, wherein the movement pattern is being immobile relative to the surface.

20. The method of claim 18, wherein the movement pattern is moving with a substantially same velocity in a direction opposite to the forward direction of travel.

21. The method of claim 9, wherein the iterative optimization algorithm is a Random Sample Consensus (RANSAC) algorithm.

22. A computer device for calibrating a radar system based on an angular offset, the radar system having been mounted on a vehicle, the vehicle having a forward direction of travel along a surface, the radar system having a scanning direction, the angular offset being an angle between the scanning direction and the forward direction, the computer device being communicatively coupled to the radar system, the computer device being configured to:
   at a given moment in time during operation of the radar system:
      receive radar data from the radar system, the radar data including point-specific data associated with a plurality of detected objects,
         the point-specific data associated with a given detected object being indicative of (i) a position of the given detected object, and (ii) an actual radial speed of the given detected object;
      determine projections of an immobile object velocity in (i) the scanning direction and (ii) a direction perpendicular to the scanning direction by using an iterative process, the immobile object velocity being associated with a subset of detected objects of the plurality of detected objects, the plurality of detected objects including detected objects that are immobile with respect to the surface and at least one detected object that is non-immobile with respect to the surface, the subset of detected objects having a plurality of objects that are immobile with respect to the surface, the projections of the immobile object velocity being derivable from the actual radial speed of the respective ones of the subset of detected objects,
   to determine the projections of the immobile object velocity including:
      during a given iteration of the iterative process:
         determine candidate projections of velocity (i) in the scanning direction and (ii) in the direction perpendicular to the scanning direction, for the plurality of detected objects based on the point-specific data of the plurality of detected objects;
         use the candidate projections of velocity and the respective positions of the plurality of detected objects to determine respective estimated radial speeds for the plurality of detected objects;
         in response to a difference between (i) the estimated radial speeds of the plurality of detected objects and (ii) the actual radial speeds of the plurality of detected objects being above a threshold,
            remove the given detected object from the plurality of detected objects thereby generating a reduced set of detected objects, the given detected object corresponding to a non-immobile object with respect to the surface;
      during a following iteration of the iterative process:
         determine new candidate projections of velocity (i) in the scanning direction and (ii) in the direction perpendicular to the scanning direction, for the reduced set of detected objects based on the point-specific data of the reduced set of detected objects;
         use the new candidate projections and the respective positions of the reduced set of detected objects to determine respective new estimated radial speeds for the reduced set of detected objects;
         in response to differences between (i) the respective new estimated radial speeds of the reduced set of detected objects and (ii) the respective actual radial speeds of the reduced set of detected objects being below the threshold,
            determine that the reduced set of detected objects is the subset of detected objects and that the new candidate projections are the projections of the immobile object velocity;
   determine the angular offset of the radar system based on at least one of the projections of the immobile object velocity; and
   perform calibration of the radar system based on the angular offset.

* * * * *